J. C. FRENCH.
SWIVEL TRUCK FOR DIPPER EXCAVATORS.
APPLICATION FILED JULY 2, 1915.
1,294,439.
Patented Feb. 18, 1919.
3 SHEETS—SHEET 1.
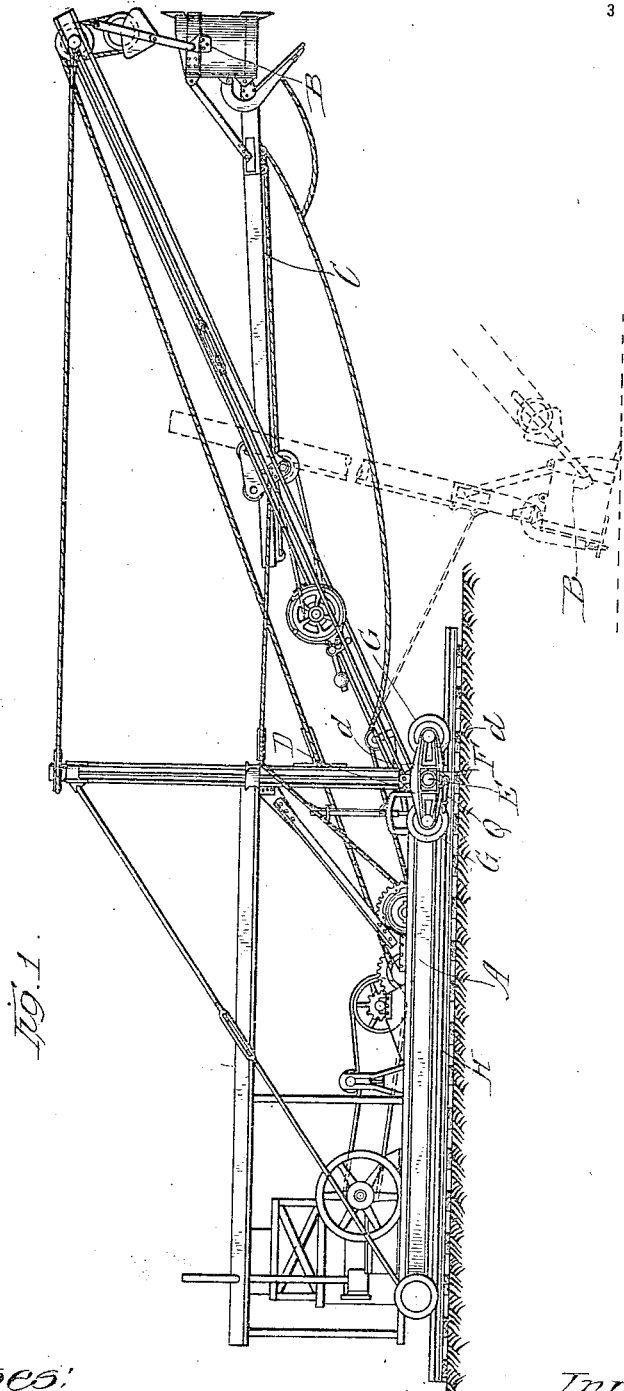

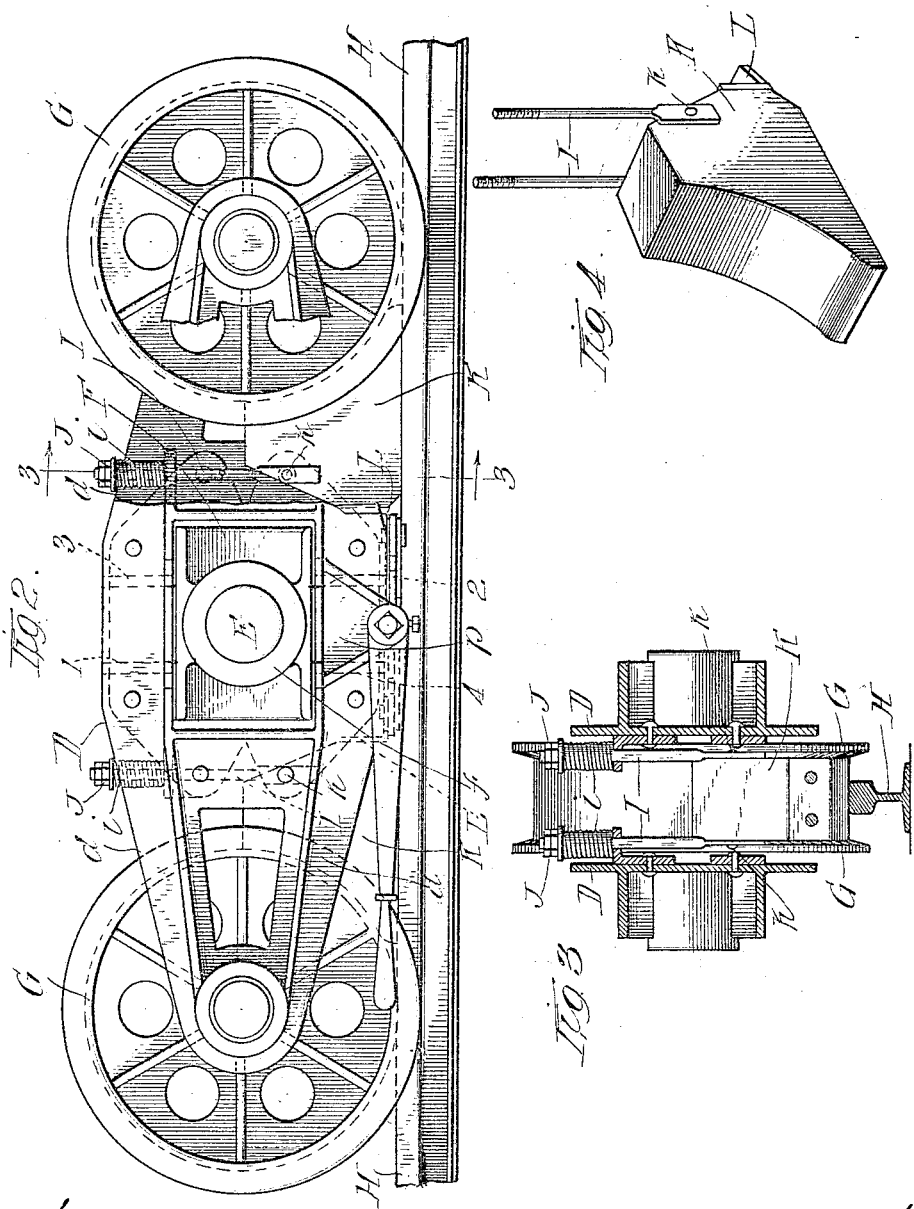

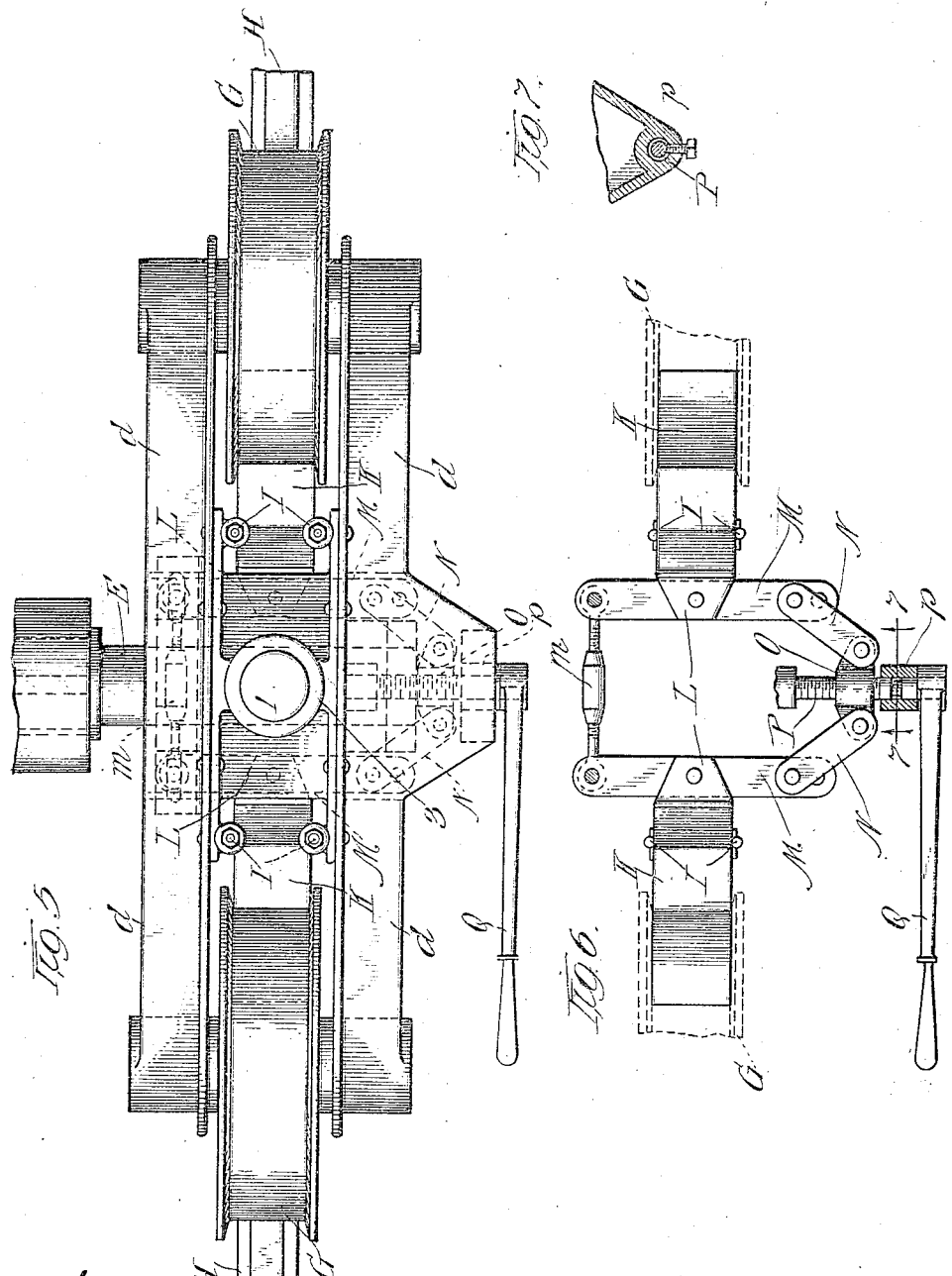

UNITED STATES PATENT OFFICE.

JAMES C. FRENCH, OF KENOSHA, WISCONSIN, ASSIGNOR TO FREDERICK C. AUSTIN, OF CHICAGO, ILLINOIS.

SWIVEL-TRUCK FOR DIPPER-EXCAVATORS.

1,294,439. Specification of Letters Patent. Patented Feb. 18, 1919.

Application filed July 2, 1915. Serial No. 37,652.

*To all whom it may concern:*

Be it known that I, JAMES C. FRENCH, a citizen of the United States of America, and resident of 772 Grant street, Kenosha, Wisconsin, where I am now living and receive mail, have invented a certain new and useful Improvement in Swivel-Trucks for Dipper-Excavators, of which the following is a specification.

My invention relates to swivel trucks for excavating and other similar machines.

The object of my invention is to provide a swivel truck of this general character in which means are provided for holding the wheels against rotation by brake shoes which also engage the rails, whereby the truck may be held in the desired position, during the operation of the excavating or other machine, and in which said brake shoes are easily and conveniently operated when it is desired to hold the truck firmly in position on the rails.

It is also an object to provide certain details and features of construction tending to increase the general efficiency and desirability of a swivel truck of this particular character.

To the foregoing and other useful ends my invention consists in matters hereinafter set forth and claimed.

In the accompanying drawings—

Figure 1 is a side elevation of a so-called dipper excavator having a front swivel truck embodying the principles of my invention.

Fig. 2 is an enlarged elevation of the truck showing certain portions thereof broken away to more clearly show some of the elements of construction.

Fig. 3 is a vertical section on line 3—3 in Fig. 2.

Fig. 4 is a perspective of one of the brake shoes.

Fig. 5 is a plan of the truck shown in Fig. 2.

Fig. 6 is a detail plan view of the toggle and screw mechanism for operating the two brake shoes.

Fig. 7 is a detail sectional view, the section being taken on line 7—7 in Fig. 6.

As thus illustrated, and referring to Fig. 1, the body A of the excavator may be of any suitable known or approved character, and the scoop B can be mounted on a dipper handle C and operated in any suitable or well known manner. In a machine of this kind, as is well known, a front truck is required which is desirably swiveled to tilt about both vertical and horizontal axes.

The truck D is of this character, being provided with a truck frame or body $d$ which is mounted on an axle or journal E extending laterally from the body frame of the machine. For this purpose the truck frame is provided with a centrally located recess or chamber F which contains a journal bearing $f$, the latter being mounted to turn on said axle or journal, whereby the truck tilts about a horizontal axis. This journal bearing $f$ is provided with upper and lower pivots 1 and 2 and these pivots are engaged by upper and lower journal bearings 3 and 4 secured respectively to the top and bottom of the truck frame. In this way the truck frame is movable about a vertical axis, as the bearings 3 and 4 are arranged to turn readily upon the vertical pivots 1 and 2, in a manner that will be readily understood. The wheels G are suitably mounted at the front and rear ends of the truck frame and are double flanged to engage and embrace the rail H, the latter being supported in any suitable manner. Vertically disposed rods I, preferably four in number, are supported by coil springs $i$ on the frame of the truck, the upper ends of these rods being provided with nuts J forming shoulders which bear upon the upper ends of said springs, whereby said rods are yieldingly supported on the truck frame. The brake shoes K are supported for movement in the truck frame, and are shaped to engage not only the wheels G, but also the tread or upper surface of the rail H, whereby the wheels are held against rotation when the truck is maintained in position on the rail. For this purpose, the said brake shoes K are pivoted at $k$ to the lower ends of the rods I, and are provided with brackets L which are in turn pivoted upon the horizontal lever arms M, as shown more clearly in Fig. 6. These lever arms M are connected at their inner ends by a turnbuckle device $m$, thus providing adjustable fulcrums for said levers, so that wear on the shoes may be taken up, and have their outer end portions connected together through the medium of two relatively short links N and a screw threaded member O forming a toggle. The horizontal and transversely arranged screw P has its inner end suitably mounted for rotation in a portion of the lower swivel bearing 4, and has its screw-threaded portion arranged to extend through the member O, whereby the latter is capable of adjustment by rotation of said screw. For this purpose a hand lever Q is secured to the outer end of said screw, in any suitable manner, and the outer end portion of said screw is journaled in a bearing p depending from the truck frame. When the hand lever Q is operated in a direction to draw the two lever arms M toward each other, the brake shoes K are thereby withdrawn slightly from the wheels, and the tension of the springs i then serves to lift the brake shoes slightly, whereby the truck may travel on the rails in the ordinary and usual manner. When the hand lever Q is operated in the opposite direction, thereby causing the toggle mechanism to force the two brake shoes away from each other, each shoe then not only bears hard against its allotted wheel, but also bears against the top of the rail, as the two shoes are in effect wedged or crowded beneath the wheels and thus forced downward against the rail. In this way a powerful braking action is obtained, causing the wheels to be held against rotation, and increasing the extent of contact or friction on the rail to such a degree that the truck will not be inclined to slide out of position.

It will be understood, of course, that for a machine of the kind shown in Fig. 1, two of these trucks are employed at the forward end thereof, one for each side of the track. In work of this kind, the rails are simply laid down loosely upon the ties, or upon other supports, and it often happens that these rails become bent and twisted, and sometimes are turned in various directions. It is for this reason that the truck is swiveled to turn about both vertical and horizontal axes, as this permits the truck to automatically adjust itself to the irregularities of the rails. With my improved brake mechanism, such as the one shown and described, the wheels are not only blocked against rotation, but in addition the brake shoes bear against the rails, and the result is that the machine is very effectively held against displacement by the forward thrust of the dipper or scoop.

What I claim as my invention is:—

1. In an excavator truck-frame provided with wheels at opposite ends thereof, substantially as shown and described, the combination of brake shoes disposed between the wheels, each brake shoe being adapted to engage the rail as well as the wheel; devices to yieldingly support said brake shoes on the truck-frame; and means including mechanism on the bottom of said truck-frame to operate said brake shoes, said mechanism including horizontally disposed levers spaced apart and provided with vertical pivots between their ends on said brake shoe, an adjustable connection between said levers at one end thereof, a toggle-joint between said levers at the other end thereof, and means including a horizontal screw for operating said toggle-joint to push said levers apart and thereby apply the brake shoes to the wheels and rails, said screw being disposed in the common plane of said vertical and horizontal axes of tilting motion for the truck.

2. In a brake mechanism for trucks, the combination of a truck-frame, wheels at opposite ends of said truck-frame, brake shoes hung on said truck-frame to engage the wheels and rails, a pair of horizontally disposed levers spaced apart and provided with pivots between their ends on said brake shoes, an adjustable connection between said levers at one end thereof, a toggle-connection between said levers at the other end thereof, and a horizontally disposed screw for operating said toggle connection to spread said levers apart and thereby apply said brake shoes to the wheels and rails.

3. A structure as specified in claim 2, said levers being arranged transversely of the truck-frame and disposed between the brake shoes, and said screw extending between the outer ends of said levers, in combination with means on the truck-frame to rotatably support the outer end portion of said screw.

Signed by me at Chicago, Illinois, this 22nd day of June, 1915.

JAMES C. FRENCH.

Copies of this patent may be obtained for five cents each, by addressing the "Commissioner of Patents, Washington, D. C."